(12) United States Patent
Lake

(10) Patent No.: US 7,398,510 B2
(45) Date of Patent: Jul. 8, 2008

(54) ESTIMATING SOFTWARE PROJECT REQUIREMENTS FOR RESOLVING DEFECT BACKLOGS

(75) Inventor: John Michael Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/828,720

(22) Filed: Apr. 21, 2004

(65) Prior Publication Data

US 2005/0240903 A1    Oct. 27, 2005

(51) Int. Cl.
*G06F 9/44* (2006.01)
(52) U.S. Cl. ..................................... 717/101
(58) Field of Classification Search ................. 717/101; 705/8, 9
See application file for complete search history.

(56) References Cited

U.S. PATENT DOCUMENTS

| | | | |
|---|---|---|---|
| 5,729,746 A * | 3/1998 | Leonard | 717/101 |
| 5,930,798 A * | 7/1999 | Lawler et al. | 707/102 |
| 6,195,590 B1 | 2/2001 | Powell | 700/36 |
| 6,343,285 B1 * | 1/2002 | Tanaka et al. | 705/400 |
| 6,513,154 B1 * | 1/2003 | Porterfield | 717/101 |
| 6,519,763 B1 * | 2/2003 | Kaufer et al. | 717/101 |
| 6,658,643 B1 * | 12/2003 | Bera | 717/101 |
| 6,675,149 B1 * | 1/2004 | Ruffin et al. | 705/8 |
| 6,715,130 B1 * | 3/2004 | Eiche et al. | 715/514 |
| 6,785,805 B1 * | 8/2004 | House et al. | 713/1 |
| 6,859,768 B1 * | 2/2005 | Wakelam et al. | 703/1 |
| 7,013,285 B1 * | 3/2006 | Rebane | 705/10 |
| 2002/0052775 A1 | 5/2002 | Fisher, Jr. et al. | 705/10 |
| 2002/0062240 A1 | 5/2002 | Morinville | 705/8 |
| 2002/0156671 A1 | 10/2002 | Libra et al. | 705/9 |
| 2003/0105657 A1 | 6/2003 | Nandigama et al. | 705/9 |
| 2003/0171972 A1 | 9/2003 | Heskin | 705/9 |
| 2003/0225470 A1 | 12/2003 | Demetriou et al. | 700/100 |

FOREIGN PATENT DOCUMENTS

JP    4153857 A    5/1992

OTHER PUBLICATIONS

COCOMO II Model Definition Manual, Barry Beohm et al, 1998, 37 pages.*
Software Engineering, 6th Edition, Ian Sommerville, Addison Wesley, 2001, pp. 511-533.*
On Time, Within Budget, Software Project Management Practices and Techniques, E.M. Bennatan, 1992, 195 pagesSoftware Project Cost & Schedule Estimating Best Practices, William H. Roetzheim et al, pp. 1-186, 1997.*

(Continued)

*Primary Examiner*—Todd Ingberg
(74) *Attorney, Agent, or Firm*—David R. Irvin

(57) ABSTRACT

Methods, apparatus, and computer program products for analyzing defect backlogs that arise in the software development process. Analysis is based on a validity ratio that projects the number of open defects that are likely to actually require fixes, a fix rate that describes the performance of the development team charged with fixing the defects, defect census data, and team performance census data. One outcome of the analysis may be an estimate of the date by which the defect backlog should be resolved. Another outcome of the analysis may be an estimate of the capacity of a team to resolve defects between a given start date and a given target date.

8 Claims, 4 Drawing Sheets

OTHER PUBLICATIONS

Software Project Cost & Schedule Estimating, William H. Roetzheim et al, 1998, pp. 1-84.*

Problem Tracking Task Reference, Continuus/PT, 1996, Part No. PTTR-041-011, Whole Manual.*

Metrics and Models in Software Quality Engineering, Stephan H. Kan, 1995, chapter 4.*

Software Inspection, tom Gilb et al, 1993, Chapter 17.*

Practical Guide to Software Quality Management, John W. Horch 1996, Chapter 5.*

Quantitative Software Management "Slim Suite Tools for Software Project Management" World Headquarters, McLean, VA, 6 pages.

Putnam, L. et al. "Five Core Metrics, the Intelligence Behind Successful Software Management" ISBN 0-932633-55-2, USA, Library of Congress Catalog No. 2003046157, pp. 177-185, 2003.

Putnam, L. et al. "Controlling Software Development" IEEE Computer Society, Press Order No. BR07452, ISBN 0-8186-7452-0, pp. 39-45, 1996.

Grady, R. "Successfully Applying Software Metrics" IEEE 0018-9162/94, pp. 18-25, Sep. 1994.

Weller, E. "Using Metrics to Manage Software Projects" IEEE 0018-9162/94, pp. 27-33, Sep. 1994.

Stark, G. Et al. "Using Metrics in Management Decision Making", IEEE 0018-9162.94, pp. 42-48 Sep. 1994.

* cited by examiner

ESTIMATING SOFTWARE PROJECT REQUIREMENTS FOR RESOLVING DEFECT BACKLOGS

FIELD OF THE INVENTION

The present invention concerns the field of software development, and more particularly concerns estimating software development project requirements for resolving dynamically generated defect backlogs.

BACKGROUND

An important aspect of the software development process centers on understanding the resources needed to complete projects on-time and according to budget. This often involves real-time forecasting of the completion dates for dynamically generated populations of tasks.

Such tasks may arise as a product of the various test phases of the development process, such as functional verification. Here, pre-planned units of work such as test cases lead to the discovery of defects, which must be fixed. Hence, further units of work are generated dynamically, as defects are discovered during execution of the test cases.

At present, project planning methods for dealing with the dynamically generated work items are imprecise at best. For example, a predetermined percentage of the development team budget may be forecast to cover fixing the defects discovered during the functional verification tests.

Unfortunately, such methods suffer from important drawbacks. Principal among these is the challenge presented to day-to-day project management, which must decide whether the current allocation of resources is adequate to resolve the current backlog of defects in the allotted time. The primary methods for deciding this question are generally ad hoc, as the typical defect lifetime is shorter than the minimum planning unit for most projects; moreover, the cost of updating the project plan with the newly identified tasks would be prohibitive.

Often, the ad hoc forecasts result in overly optimistic estimates of the available capacity of the development team. As a result, development resources may be over-committed to draining the defect backlog, at which point fewer resources are available for the development of new code. In the worst case, this may lead to a positive feedback situation, wherein the increasingly thinly stretched developers generate increasingly more defects, which necessitate the shift of an ever-larger portion of the available resources from developing new code to draining the defect backlog.

Thus there is a need for a better way to forecast the completion date for a dynamically generated defect backlog, or, conversely, to forecast the resources needed to drain a dynamically generated defect backlog by a specified date.

SUMMARY

Aspects of the invention include methods, apparatus, and computer program products for analyzing defect backlogs that arise in the software development process. Analysis is based on a validity ratio that projects the number of open defects that are likely to actually require fixes, a fix rate that describes the performance of the team charged with fixing the defects, defect census data, and team performance census data. One outcome of the analysis may be an estimate of the date by which the defect backlog is expected to be resolved. Another outcome of the analysis may be an estimate of the capacity of a team to resolve defects between a given start date and a given target date.

DETAILED DESCRIPTION

Software defects may be modeled using six states. The states, which are described below, are: open, working, verify, closed, returned, and canceled.

Tracking through the states of the model begins when a defect is discovered and a bug report is filed. At this point, the newly found defect is in the open state. A developer then evaluates the defect, and determines whether a fix is required. If so, the defect moves to the working state, and the developer opens an associated track, codes a fix for the defect, and gives the track "integrate status." The code changes in tracks having integrate status are applied to the source code when a new software build is started.

The build script is then executed. If the execution completes successfully, the defect moves to the verify state. The originator of the defect, or the originator's representative, then examines the execution of the altered source code for correctness. If the originator or the representative concludes that the defect has been fixed satisfactorily, the defect moves to the closed state, which indicates that the defect needs no further attention.

When the developer who evaluates the defect determines that a fix is not required, the defect moves to the returned state. A defect in the returned state may be re-opened, perhaps with additional information, or may move to the canceled state, at the option of the defect report originator. The model's canceled state and closed state are equivalent, in the sense that a defect in either of these states requires no further work.

Defect census data for each date of relevant activity is kept in a defect census data repository, which may reside in, for example, a spreadsheet or a database. The defect census data summarizes the numbers of defects in each of the states defined by the six-state model. The persistence of the defect census data preferably covers at least five software builds.

Figure 1:
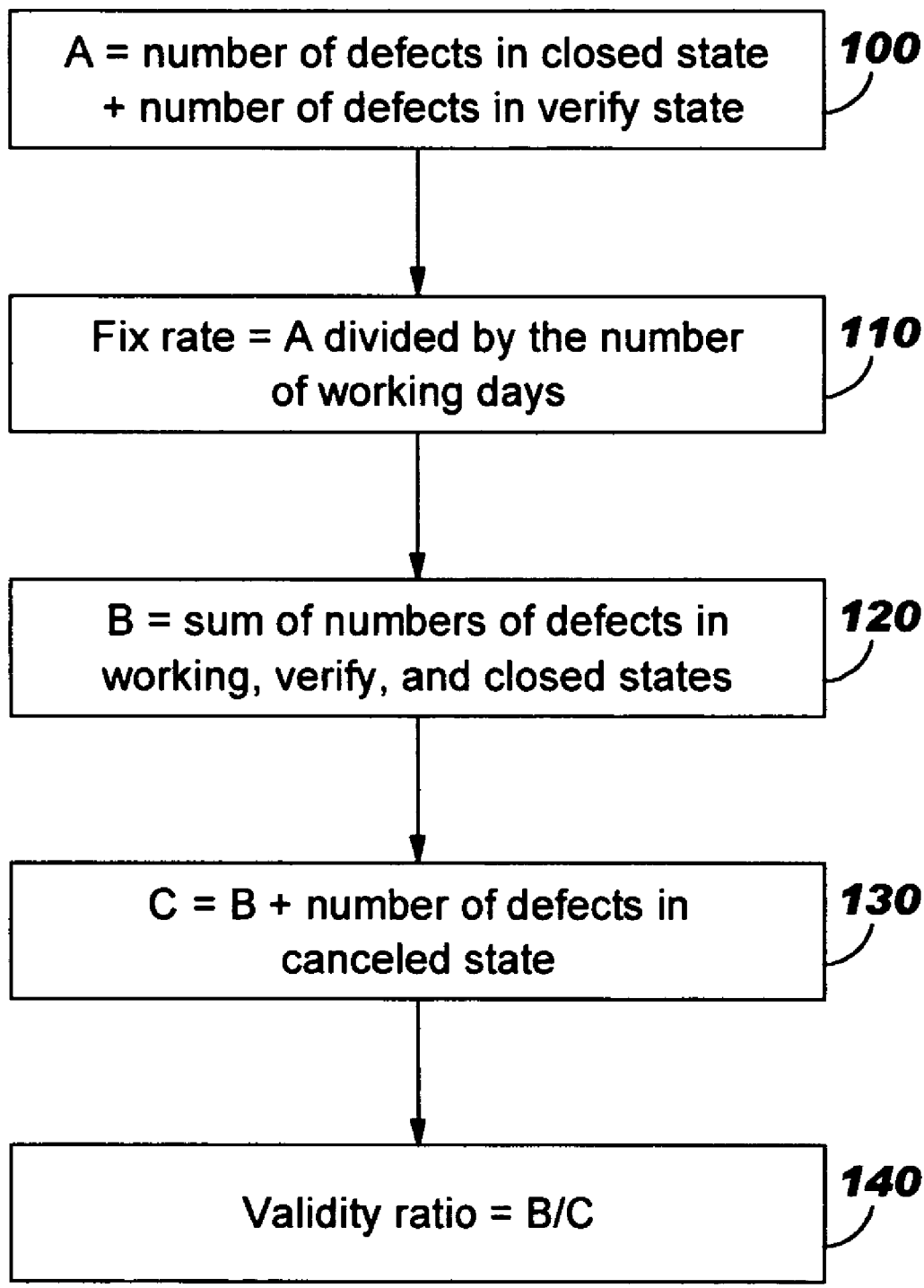
FIG. 1 is a flowchart showing computation of a fix rate and a validity ratio.

Defects are fixed by teams of developers or by individual developers, both of which are called here "teams" for descriptive convenience. For each team, a fix rate may be computed from the defect census data, as shown in FIG. 1. The number of defects in the closed state and the number of defects in the verify state are added together (step 100), and the resulting sum is divided by the number of working days for the team, thereby giving the fix rate (step 110). The number of working days is the number of days the team spent actually working on resolving the defects in the defect census data repository, as opposed to working on other development activities, or holidays, weekends, and so forth. For example, at the end of five builds taking a total of 20 working days, a team may have sent 100 defects to the closed state and have 20 defects remaining in the verify state. The fix rate for that team would be 120 divided by 20, or six per working day.

Over the course of time, statistics may be collected regarding fix rates, giving average and Nth-percentile fix rates for the various teams. Here, these are called team performance census data. The team performance census data may be stored in a team performance census data repository, which may be held in, for example, a spreadsheet or database.

The proportion of the defects in the open state that are expected to actually require a fix is described by a validity ratio. The validity ratio may be computed as further shown in FIG. 1. The numbers of defects in the working, verify, and closed states are added together, to provide a sum B (step 120). The numbers of defects in the canceled, working, verify, and closed states are added together to provide a sum C (step 130). B is divided by C to provide the validity ratio (step 140). Again, counts of the numbers of defects in the various states are taken over a five-build span of time. For example, suppose that the number of defects in the working state is six, the number of defects in the verify state is six, the number of defects in the closed state is 100, and the number of defects in the canceled state is eight. In this case, the validity ratio is about 0.933.

The defect backlog for a given project or build may be analyzed using the fix rate and the validity ratio. One outcome of the analysis may be a forecast of when the defect backlog should be resolved or drained, i.e., the date by which all of the defects are expected to be in the closed or canceled states. This date is called here the "drain date."

Figure 2:
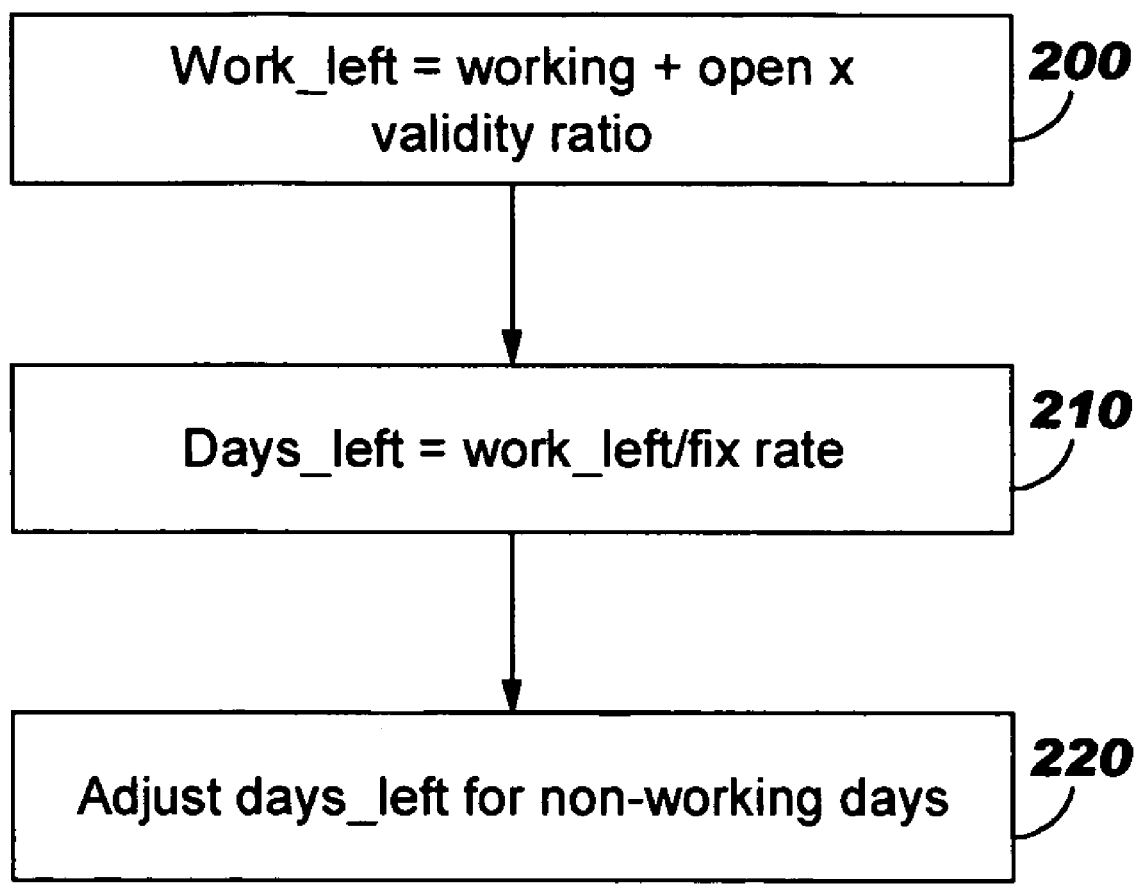
FIG. 2 is a flowchart that shows an exemplary process for estimating a drain date for a defect backlog, using the fix rate and the validity ratio.

An exemplary process for estimating the drain date is shown in FIG. 2. To compute the estimate, the number of defects in the open state is multiplied by the validity ratio, and the resulting product is added to the number of defects in the working state (step 200). This sum may be called the "work_left." The work left is then divided by the fix rate (step 210). This quotient may be called the "days_left." The quotient days_left is then converted to the drain date with respect to the starting date, by adjusting for non-working days (step 220).

For example, suppose that there are ninety-one defects in the open state, and eleven defects in the working state. Continuing the example begun above, wherein the validity ratio is about 0.933, gives a work_left value of about 96 defects. Using a fix rate of 6 defects per day gives about 16 for the value of days_left. Suppose, for example, that the start date, which coincides with the date that the drain date is estimated, is May 5, 2004. Suppose that Saturdays and Sundays are not working days, that May 31 is a holiday, and that the team in question is scheduled for other duties on May 12, 13, and 14, which therefore do not count as working days. The drain date will then be about 16 working days from May 5, which is Jun. 1, 2004.

Above, an average fix rate was used to compute days_left, and thus the drain date. As mentioned earlier, N-th percentile team performance census data may be kept. This data may be used to generate N-th percentile estimates of the drain date. Intuitively, the more frequently a team has produced at a rate exceeding a given fix rate, the more confidence can be placed in the assumption that the team will produce at a rate exceeding the given fix rate in the future. Thus, observed fix rates at the $99^{th}$, $90^{th}$, $75^{th}$, $50^{th}$, $25^{th}$, and $10^{th}$ percentiles may be kept in the performance census data repository, and used to provide corresponding drain dates having confidence levels from 1-90%. In another embodiment, the various fix-rate percentile estimates may be derived from the moments of a probability density function that is believed to fit the work rate of a particular team, or teams in general, based on empirical or theoretical considerations.

Figure 3:
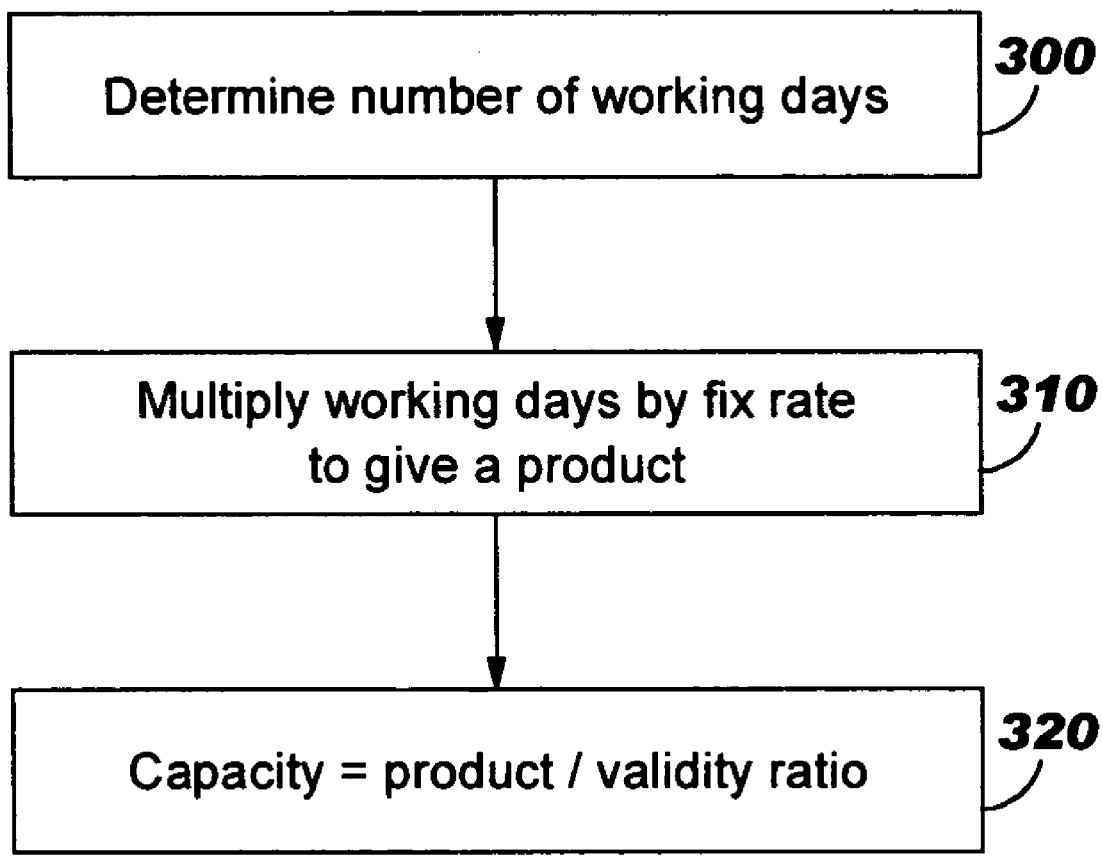
FIG. 3 is a flowchart that shows an exemplary process for estimating the capacity of a development team to fix defects between given start and target dates, using the fix rate and the validity ratio.

Another outcome of the analysis of the defect backlog may be a forecast of the defect processing capacity remaining between a start date and a predetermined target date. An exemplary process for estimating this capacity is shown in FIG. 3. The number of working days between the start date and the target data is determined (step 300). The number of working days is then multiplied by the fix rate (step 310), and the resulting product is divided by the validity ratio (step 320). The resulting quotient is the remaining capacity, stated in numbers of defects. For example, suppose that there are ten working days between the start date and the target date. If the fix rate is six per day, and the validity ration 0.933, the capacity of the team over the ten working days is about 64 defects. Again, the N-th percentile statistics of the fix rate may be used to compute corresponding confidence levels of the capacity.

Figure 4:
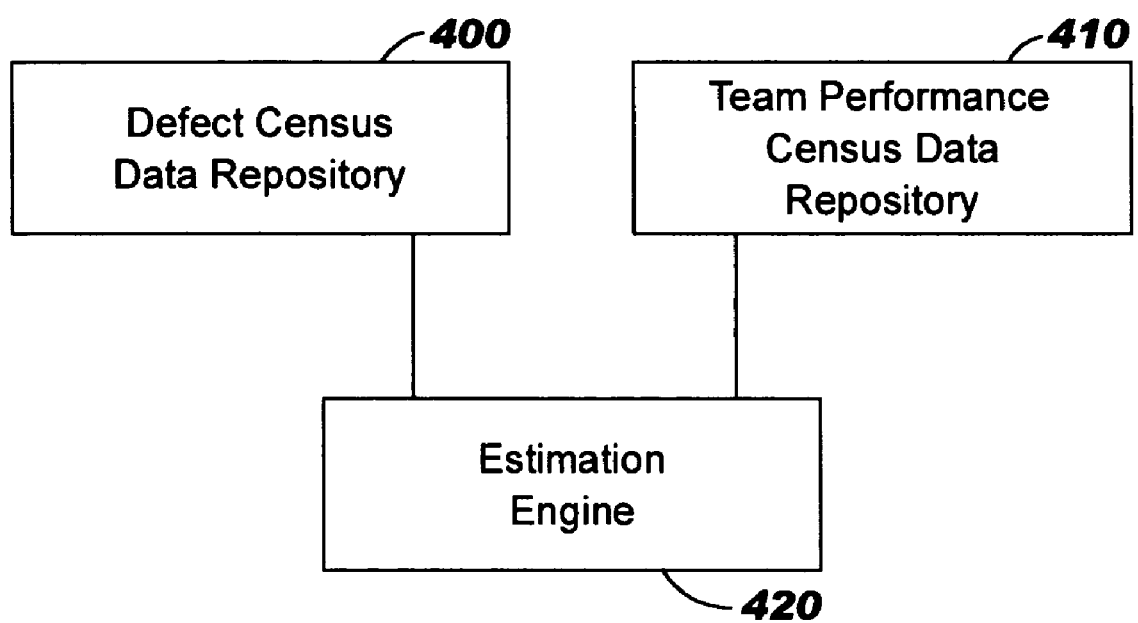
FIG. 4 is a block diagram that shows exemplary apparatus suitable for executing the processes of FIGS. 1-3.

FIG. 4 shows exemplary structure of apparatus suitable for use according to the present invention. A defect census data repository 400 holds the defect census data, a team performance census data repository 410 holds team performance census data, and an estimation engine 420 performs the computations mentioned above in the discussions concerning FIGS. 1-3. This particular structure is shown only for the sake of descriptive clarity with regard to these earlier discussions, and is not limiting of the invention. In practice, the functions of the blocks of FIG. 4 may be performed by, for example, the various elements of a personal computer, workstation, server, and the like. The repositories and the estimation engine may be embodied partly or fully by a spreadsheet or other mathematical software executed by a programmable processor such as a processor in a personal computer, workstation, server, and the like.

The present invention also encompasses computer program products, including program storage devices readable by a machine, tangibly embodying programs of instructions executable by the machine for implementing the methods and apparatus described above. The program storage device may take the form of any media that can contain, store, communicate, propagate, or transport the program for use by the machine. These media include, for example, computer diskettes, RAM, ROM, CD, EPROM, communication media for transferring instructions, and the like.

Although the foregoing has described methods, apparatus, and computer program products for estimating the drain date of a software defect backlog and for estimating the capacity of a team to fix defects over a specified period of time, the description is illustrative of the invention rather than limiting, and the invention is limited only by the appended claims.

I claim:

1. A program storage device readable by a machine, tangibly embodying a program of instructions executable by the machine to perform method steps for estimating software project requirements, said method steps comprising:
    computing a validity ratio for defects in an open state;
    computing a fix rate for a team; and
    analyzing a software defect backlog that includes the defects in the open state, using the computed validity ratio and the computed fix rate;
    wherein the step of computing a validity ratio includes steps of adding numbers of defects in working, verify, and closed states, to provide a first sum; adding the numbers of defects in the working, verify, and closed states and a number of defects in a canceled state, to provide a second sum; and dividing the first sum by the second sum, to provide the validity ratio.

2. The program storage device of claim 1, wherein the validity ratio is computed using defect census data read from a defect census data repository.

3. The program storage device of claim 1, wherein the fix rate is computed using team performance census data read front a team performance census data repository.

4. The program storage device of claim 1, wherein the step of computing a fix rate includes steps of adding the number of defects in the closed state and the number of defects in the verify state, to provide a third sum; and dividing the third sum by a number of working days to provide the fix rate.

5. The program storage device of claim 4, wherein the step of analyzing a software defect backlog includes a step of computing a drain date for the backlog, using the validity ratio and the fix rate.

6. The program storage device of claim 5, wherein the step of computing a drain date includes steps of multiplying the number o defects in the open state by the validity ratio, to provide a product; adding the product to the number of defects in the working state, to provide work left; dividing the work left by the fix rate, to provide days left; and adjusting the days left for non-working days, to provide the drain date.

7. The program storage device of claim 4, wherein the step of analyzing a software defect backlog includes a step of computing a capacity of a team to fix defects, using the validity ratio and the fix rate.

8. The program storage device of claim 7, wherein the step of computing a capacity includes steps of multiplying a number of working days by the fix rate, to provide a product; and dividing the product by the validity ratio, to provide the capacity.

* * * * *